United States Patent [19]

Sherwood

[11] Patent Number: 5,163,997
[45] Date of Patent: Nov. 17, 1992

[54] HIGH-PRODUCTION ROTARY FURNACE STEELMAKING

[76] Inventor: William L. Sherwood, 7249 Cypress St., Vancouver, B.C., Canada, V6P 5M2

[21] Appl. No.: 652,536

[22] Filed: Feb. 8, 1991

[51] Int. Cl.⁵ .............................................. C21B 13/08
[52] U.S. Cl. ...................................... 75/527; 266/213
[58] Field of Search .......................... 75/527; 266/213

[56] References Cited

U.S. PATENT DOCUMENTS 2,274,946  3/1942  Vogel-Jorgensen ................. 75/527
4,615,511  10/1986  Sherwood ............................ 75/584

*Primary Examiner*—Melvyn J. Andrews

[57] ABSTRACT

The invention is a process for steelmaking in a rotary furnace from a solid metallic charge adapted to realize greatly increased heat transfer and melting rates and thereby greater steel production. A hot liquid metal bath is maintained over the length of an oxy-fuel fired rotary furnace. Solid metallic scrap is continually introduced by way of a charge end opening into a melting zone, wherein the bath melting point temperature is depressed on the order of 300 degrees celsius at the furnace charge end, by means of coincident additions of supplementary carbon into the melt. The effect is a multifold increase in temperature differential between the flame temperature and the temperatures of the furnace walls and charge, with a proportionate increase in the quantity of heat transferred. In order to maintain this depressed temperature, a corresponding increased quantity of cold solid scrap is required to be charged into the melt and advanced along the furnace, according a dramatic production rate increase in relation to the prior art. The preferred embodiment provides an intermediate annular dam which substantially confines unmelted solid charge to the melting zone, over which melted metal overflows into an all-liquid refining and temperature-adjustment zone preceding discharge, with overall firing and furnace interior gas flow countercurrent to the general charge movement, thus allowing the steel discharge temperature to be controlled independently of the heating rate. Other benefits include increased refractory life, less oxidation of charge and refractory consitituents, and substantially less particulates and pollutants discharged in the process off-gas.

9 Claims, 2 Drawing Sheets

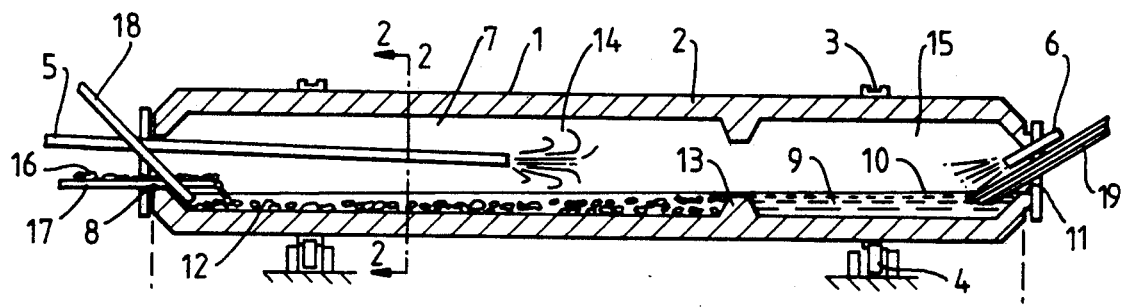
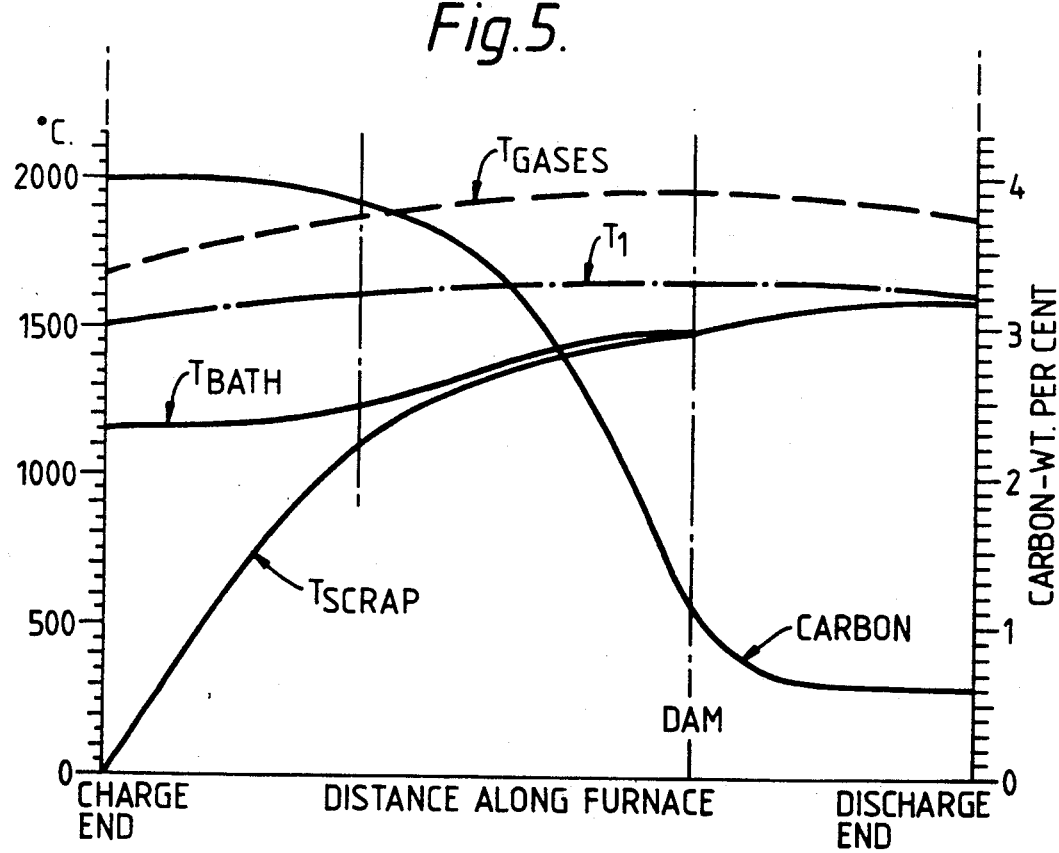

HIGH-PRODUCTION ROTARY FURNACE STEELMAKING

The invention relates to the art of iron and steel making and, more particularly, is a process for steelmaking in a rotary-furnace realizing high charge heating and melting rates and thereby markedly higher rates of production.

Rotary furnaces heretofore have been utilized mainly for batch-wise melting of cast iron with only very limited application to steel, and with very low production rates in comparison to those employed in steel producing plants. My issued U.S. Pat. Nos. 4,105,438; 4,456,476; 4,541,865; and 4,615,511 describe rotary furnace processes and apparatus adapted for continuous steelmaking, primarily from a metallic charge. A perception that this technology also has a relatively low rate of production when compared, for example, to basic oxygen and electric-arc steelmaking, has proven to be a barrier to its implementation in high-tonnage steel production.

In melting of steel scrap in fuel-fired furnaces, such as open-hearth furnaces and rotary furnaces, the melting temperature of steel is high and very close to the maximum permissable operating temperature of the refractories. Since the rate of heating varies directly according to the temperature differential between furnace and charge, this limitation on the maximum temperature differential has also been a key limit on attainable production rate.

The total amount of heat transferred depends directly upon the effective heat transfer area. In the case of rotary furnaces, as compared to stationary and tilting hearth furnaces, a very substantial additional heat transfer area is provided for heating by cyclical flame-to-wall, followed by wall-to-charge heat transfer, during each rotation as the furnace wall passes beneath the charge.

This invention is a steelmaking process and apparatus adapted for achieving a multi-fold increase in melting heat transfer rate, featuring means for receiving the furnace-to-charge temperature differential in the steel melting zone, by depressing the temperature of the melt essentially independently of the flame and furnace temperature.

According to the invention, a process is provided by steelmaking in an elongated rotary furnace with axial charge end and discharge end openings, comprising the combination of the following steps:

(a) maintaining a hot liquid ferrous metal bath over the length of the furnace extending between said end openings by means of radiant heating, comprising combustion of fuel and oxygen, to heat said bath surface directly from above and also indirectly by heating the inner furnace walls and thereby said bath by direct transfer from the wall surface to the under-surface of the bath during each rotation, with a substantial portion of said length comprising a melting zone containing solid charge not yet melted;

(b) introducing supplementary carbon proximate the charge end opening to dissolve in the bath in sufficient quantity to thereby effect a substantial depression of the melting-zone bath melting point to a lowered melting-point temperature level which is a substantial amount lower than is characteristic of melted steel scrap and rather is characteristic of iron containing carbon in the range of about 2 to 4.25 per cent carbon;

(c) cooling the melting zone bath to maintain a temperature approaching said lowered melting-point temperature level during operation by continually adding solid steel scrap into said liquid ferrous metal bath also proximate said charge end opening;

(d) continually advancing said solid steel scrap forward along said melting zone at a substantially faster average rate than the liquid ferrous metal bath charge, but not so rapidly that there is insufficient scrap present at each furnace cross-section to absorb substantially an equivalent quantity of heat to that transferred from said furnace to said liquid bath, that is, as necessary to maintain said temperature approaching said lowered melting-point temperature level, at each cross section of said melting zone, by heat transferred from the furnace gases and walls, via said liquid metal, terminating within said solid steel scrap; and (e) discharging molten liquid ferrous metal from proximate said discharge end opening following the completion of melting.

The preferred embodiment includes the step of restricting the metal flow cross-section at an intermediate location along the furnace by means of an annular dam, thus substantially obstructing solid scrap from further passage and providing a substantially 'solid-free' temperature-adjustment and refining zone extending to the discharge end, allowing liquid metal flow essentially only one-way from melting zone to refining zone in the axial direction, without back-mixing across said annular dam restriction.

Ideally, the average axial rate of advance of the liquid metal along the melting zone approaches zero whereby solid steel scrap just melted comprises the major portion of the liquid passing on from the melting zone.

In an economically advantageous mode of operation, the melting zone bath is confined within magnesia-carbon refractory walls whereby the high bath carbon content substantially decreases refractory loss caused by refractory-carbon oxidation, and the lag layer is maintained at or nearly magnesia-saturation, decreasing the erosion of magnesia by its dissolution in the slag.

There are objects and advantages of the present invention additional to the increase in production rate. Firstly, the refractories operate at a lower average temperature and extreme superheat of the furnace interior is rendered unnecessary to realize satisfactory melting rates. There is therefore a coincident increase in refractory life expectation. This is in addition to the benefits from the above features employing magnesia-carbon refractories and magnesia-saturated slags. In view of the throughout increase, overall improvement in refractory usage per unit of steel output is very substantial.

Secondly, by immediately submerging the ferrous scrap in liquid high-carbon iron upon charging, surface oxidation during melting is essentially eliminated, substantially reducing the presence of FeO and facilitating control of slag and metal composition and increasing metal yield. This is an immense benefit when considered in comparison to oxy-fuel burner melting applied in open hearth furnaces, electric-arc furnaces or batch-type rotary furnaces.

Thirdly, the process of the invention almost completely eliminates or suppresses the discharge of iron oxides and other particulate emissions in the off-gas, or of unburned combustibles. The established alternatives, such as electric-arc and basic oxygen furnaces, generate particulates in quantities many times greater than this invention. Oxy-gas flames also generate negligible nitrogen oxides. Because of the high process thermal efficiency, there is also much less carbon dioxide generated than with the alternatives.

It will be understood that the background, objects, advantages and general summary of the invention has been only generally described and that various other objects, features and advantages of the process and apparatus of this invention will become apparent from the following detailed description and claims, and by referring to the accompanying drawings, in which:

FIG. 1 is a diagrammatic side view in section of the rotary furnace of this invention during operation;

Figure 3:
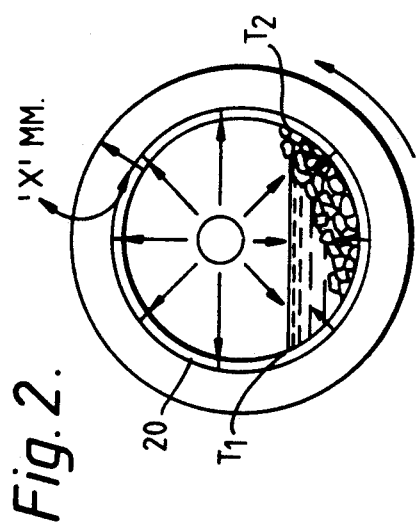
FIG. 3 is a graph illustrating the general pattern of temperature distributing within the refractory lining of the furnace during operation.
Figure 4:
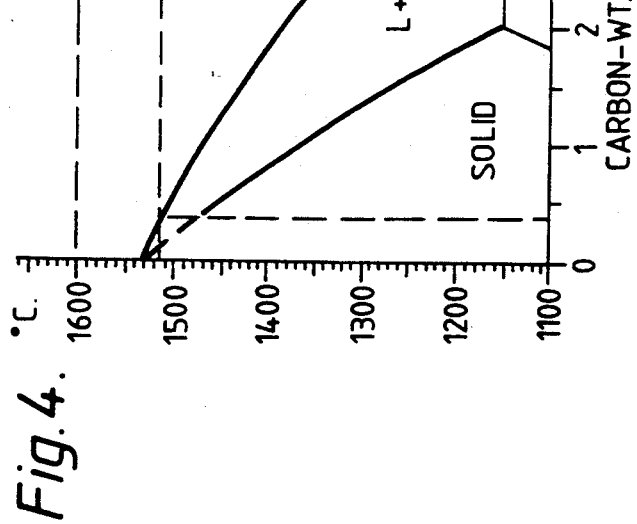

FIG. 4 represents two graphs, one being a magnified view of detail 3—3, FIG. 3, showing the temperature distribution immediately beneath the inside refractory surface, and the other showing the relevant portion of the iron-carbon phase diagram, with dotted lines connecting the graphs which relate bath carbon and temperature to the amount of heat transferred into the bath per rotation of the furnace; and FIG. 5 is a graph showing representative temperatures and carbonates along the length of the rotary furnace of FIG. 1.

Referring to FIG. 1 the rotary furnace shell 1 is lined with refractory 2 and mounted for rotation on trunnions 3 riding upon rollers 4 in known manner, rotated by means of an adjustable speed drive assembly. The furnace is heated at the charge end by one or more water-cooled oxy-fuel burners 5 and at the discharge end by burner 6, generally burning gas, oil or powdered coal in combination with oxygen or oxygen-enriched air. The general flow of furnace gases 7 is counter-current to the general charge movement, whereby the combustion products of oxy-fuel burner 6 supply heat for refining and adjustment of the steel discharge temperature, and also provide supplementary heat for melting. The combustion products 7 from both burners exit via axial charge end opening 8. Liquid steel is withdrawn at a controlled rate via siphon tube 19 and slag 10 is discharged semi-continuously by overflowing the lip of axial discharge opening 11 or can be skimmed or removed by vacuum slag cleaner. This is described as a preferred embodiment and it will be evident that tap-holes or other discharge methods, and other heating methods such as electric-arc and/or plasma assisted methods maybe used as well as other modifications.

The furnace incline is close to level, usually less than one degree; so that the liquid metal bath 9,12 extends for the full length of the furnace, being retained by annular dam restriction of axial charge and discharge openings 8,11. An additional annular dam 13, over which only a markedly restricted flow area is provided, divides the furnace into two zones, a melting zone 14 and a refining and temperature-adjustment zone 15. It is to be understood that the furnace is primarily a melting unit and this latter zone, commonly may carry out only minimal 'refining', with final composition adjustment and other refining steps being conducted following discharge from the furnace, according to various post-treatment methods, as established in the art of ladle metallurgy. Ferrous scrap 16 is charged by way of water-cooled charging conveyor 17 into the molten metal 12 within the melting zone 14.

Figure 2:
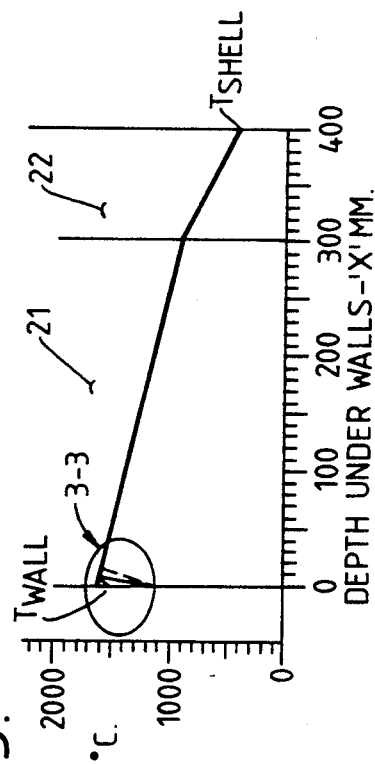
FIG. 2 is a diagrammatic cross-section view of the loaded rotary furnace during operation, along plane 2—2 of FIG. 1, illustrating the sequence of heat transfer during furnace rotation.

The essence of the invention resides in adjusting and controlling: firstly, temperatures and, secondly, the relative movement, of the solid and liquid components of the charge, together in such a way as to enable a substantially higher rate of throughput in comparison to the prior art. Referring also to FIG. 2, it will be seen that the oxy-fuel burners 5, 6 release hot combustion products from which, in view of the high temperatures, heating occurs predominantly by radiation directly on to the liquid charge surface and also the refractory wall inside surface. For example, at cross section 2—2 during each revolution of the furnace, each point on the walls is heated to temperature T1 by the furnace gases, then cooled to temperature T2 during passage under the charge. FIG. 3 shows a typical stead-state refractory temperature gradient, upon which this cyclical heating and cooling of the inside walls is superimposed. The carbon-magnesia working lining 21 has a higher thermal conductivity than the back-up lining 22 of insulating refractory, hence shows a flatter temperature gradient. The temperature cycling of the inner surface walls occurring during each furnace rotation is also illustrated in FIG. 4 as a magnified view of detail 3—3.

Owing to the intimate contact, combined with the rapid relative motion, heat transfer from wall surface to liquid charge is very efficient, refractory temperature T2 approaching the liquid metal temperature. Referring to the iron-carbon system phase diagram, as reproduced in FIG. 4, it will be seen, for typical 0.4 per cent carbon steels, that the bath is all liquid only down to 1515 C and that liquid metal does not exist below about 1470 C. For a typical magnesite working lining, a typical temperature-depth variation pattern is illustrated as the triangular area T1-A-T2 (PA) (prior art). The depth 'A' of heat penetration corresponds to a rotational speed of approximately 4 revolutions per minute. The area of the triangle defines the amount of heat transferred in-and-out of the refractory into the bath during each revolution of the furnace, taking into account the weight and specific heat of the refractory to the depth of the affected area.

Referring again to the phase diagram, if the carbon content of the melt is increased to approximately 4 per cent, the bath is all liquid down to 1180 C, and mostly liquid to 1150 C. Accordingly, a key step in carrying out the process of this invention is to maintain an elevated carbon level in the melt proximate the charge end of the melting zone 14, thereby depressing the fusion temperature of the melt. This is preferably accomplished by injecting carbon pneumatically balance 18 in known manner. It is also possible to add carbon raiser as coke, graphite, etc. with the charge, or as pig iron, although these methods are less effective in obtaining immediate dissolution at the charge end to provide maximum benefit during melting.

Since the furnace burners will normally maintain a high bath temperature in the absence of coolant, a second key step, in combination with the first, is continually adding sufficient solid ferrous scrap to remove the superheat and maintain the liquid metal bath cooled down to a substantially lower temperature, preferably proximating the liquidus temperature, as represented on the phase diagram. Under these conditions, the temperature-depth pattern is illustrated by the triangle T1-A-T2(IN) (according to the invention). In this example, the quantity of heat represented at the cross-section illustrated is nearly five times that of the prior art. It is, of course, required that burner heat output be adjusted to maintain temperature T1 at a similar level in both cases.

For maximum heating effect, there should be enough scrap present, at each cross section of the melting zone, to suppress the melt to approximately the liquidus temperature, without such an excess to cause pileups and erratic charge movement. In order to maximize the extent of the desired liquidus temperature depression, the amount of low-carbon dilution by early melt-zone scrap melting should be postponed as long as possible. Further, steel is the usual end product, with the majority of steel containing less than 0.5 per cent carbon, and a moderated carbon content is therefore desirable of the liquid passing over dam 13 into the refining zone. A third process step, therefore, is to advance the solid charge through the melting zone at a significantly higher rate than the liquid metal, whereby the high-carbon melt acts mainly as a heat-transfer medium rather than as material in-process, the rate of advance being regulated by the furnace slope nd rotation speed in a manner taking into account the above conditions. Typically, the scrap remains mostly solid until about the last third of the melting zone, wherein the melt consists mainly of liquid scrap being continually generated in situ by melting solids, whereas in the first third, the melt is essentially high-carbon liquid iron maintained there as semi-permanent heat-transfer media.

The term ferrous scrap 16 is used to describe mainly scrap steel, the major portion of which contains less than 0.5 per cent carbon, although certain grades carry more than 1 per cent. Sponge iron normally contains carbon in the same general range as steel scrap and thus may be considered synonymous with it when this is the case. When pig iron and/or cast iron are included in the charge, they represent significant carbon additive sources, as well as metallic charge sources, and thus as supplementary carbon raisers. Since a specific time is required to reach melting temperature, however, this addition method is not as effective as direct carbon injection in lowering the temperature in the first half of the melting zone.

The heat transfer pattern in the refractory may be approximated using numerical methods-finite difference, or Gauss' error integral. Triangles T1-A-T2 were estimated at a furnace rotation speed of 4 revolutions per minute and T1-B-T2 at 1 rpm. It may be seen that the maximum heat penetration depth is approximately 14 mm at 1 rpm and 7 mm at 4 rpm, or one-half as much, with the areas in proportion. Since the latter cycle is repeated 4 times as often, the amount of heat transferred at 4 rpm is about twice as much in real time, and it follows that the heat transferred this way increases roughly proportionally to the square root of the rotational speed.

FIG. 5 illustrates an exemplary pattern of temperature variations and bath carbon contents during passage through the furnace. It will be evident, in the melting zone and also the refining zone, that some axial back-and-forth mixing of liquid charge will occur. In other words, some portion of the carbon injected at the charge end may pass by mixing action along as afar as dam 13, thereby diluting the melting scrap at that location nd increasing the carbon in the melt passing into the refining zone. The amount of this dilution will vary with furnace size, length-to-diameter ratio, rotation speed, etc. The severe restriction at dam 13, and relatively high axial flow velocity over the dam, precludes back-mixing only at this location, between melting and refining. It is also established that some steel scrap melting also occurs by carbon diffusion at temperatures well below steel melting temperatures, such as conditions at the furnace charge end.

In a case where a substantial carbon reduction is required in the refining zone, e.g. from 2 per cent down to 0.2 per cent, supplementary oxygen lancing may also be employed in the refining zone 15. Since these reactions are exothermic, burner heat input from the discharge end would be decreased, and the oxygen: fuel ratio also may be increased in the melting zone firing, in order to utilize the surplus carbon monoxide generated by injection.

The illustration FIG. 1 also shows only two burners 5,6. It will be appreciated that additional, or multiple, burners may also be used, inserted from either end on projecting any selected distance, as deemed beneficial to improve the distribution of heat release inside the vessel. Base upon oxygen purity of 90 per cent or more, and natural gas for example, the furnace atmosphere will be approximately one-third carbon dioxide and two-thirds water vapour, resulting in very good overall emissivity, thereby allowing some latitude in burner location and direction whilst maintaining satisfactory operation.

To illustrate the process features by way of an example, a rotary melting furnace, operated generally according to the foregoing description and drawing FIGS. 1–5, has an approximate diameter of 2 meters, as measured inside the refractory lining, and a length of 18 meters, of which 12 meters represents melting zone 14, which has a working lining of carbon-magnesia refractories. The longitudinal furnace axis is inclined at an angle of approximately one-half degree and the charge depth is in approximately 0.35 meters at the charge end, increasing to 0.5 meters at the discharge end, with an average depth in the melting zone of approximately 0.4 meters.

When operated continuously at a rotation speed of 4 rpm, including charge end carbon injection and the general temperature pattern of FIG. 5, the rate of heat transfer into the charge within the melting zone ranges from approximately 190,000 Kg.Cal. per square meter per hour in the first third of the melting zone down to 80,000 just prior to passage over dam 13, with a representative average of about 140,000 for the entire melting zone 7. The refractory walls have a total surface area of approximately 76 and the bath surface 18 square meters. The amount of heat transferred via flame-to-walls-to-charge is thus on the order of 10 million Kg.-Cal. per hour. The metal bath passing over dam 13, at 1500 C, contains approximately 320 Kg.-Cal. per Kg. above 25 C ambient charge temperature. The melting rate is thus equivalent to 13,000/320 or approximately 40 metric tons per hour, also representing the charging rate for fresh steel scrap at the charge end.

The total charge weight is approximately 66 metric tons, whereby the average furnace residence time is about 100 minutes, of which 60 minutes represents melting-zone time and 40 minutes refining-zone time. At a rotation speed of 4 revolutions per minute, solid scrap will traverse the 12-meter melting zone length in approximately 35 minutes, moving significantly more rapidly than the charge as a whole. This relatively faster movement assures that scrap melting takes place predominantly in the last third of the melting zone, resulting in a carbon content well under 2 per cent at passage on to refining, whilst at the same time injecting carbon at the charge end to maintain liquid iron there containing 4-4.3 per cent carbon.

The production rate of 40 tones per hour is close to three times the melting rate for direct charge into a low-medium-carbon steel bath, with equivalent inside-furnace temperatures. At the same time, the overall fuel consumption, with oxy-fuel combustion, is less than 600,000 Kg.-Cal. per tonne. Furnace temperatures can, of course, be raised simply by increasing the fuel-oxygen firing rates, but at a corresponding sacrifice in the life of refractories and fuel efficiencies. The process and apparatus of this invention thus renders high production feasible, together with cost-effective maintenance requirements and fuel rates, as not heretofore practical in the prior art.

It will be appreciated that the preferred embodiments of a process and apparatus for high-production rotary furnace steelmaking have been described and illustrated and that variations and modification may be made by persons skilled in the art, without departing from the scope of the invention defined in the appended claims.

I claim:

1. A process for steelmaking in an elongated rotary furnace incorporating refractory inner furnace walls extending along the length of the furnace from a restricted annular charge end opening to a restricted annular discharge end opening, comprising the combination of the following steps:
   (a) maintaining a hot liquid ferrous metal bath with a bath top surface spanning and confined between said charge end and discharge end openings and at least partially covered by a layer of slag, with undersurface contained and supported within said inner furnace walls, and with a melting zone comprising a substantial portion of said furnace length holding a melting zone bath containing solid charge not yet melted;
   (b) supplying heat to said bath by combustion of fuel and oxygen to effect heat radiation directly onto said bath and slag surface form above and also indirectly by heating said inner furnace walls and thereby said bath by direct transfer from said wall surface to said under-surface of the bath during each rotation, during the interval that the heated walls are passed beneath and in direct contact with said bath;
   (c) introducing supplementary carbon proximate the charge end opening to dissolve in the bath in sufficient quantity to form a liquid heat-transfer medium within said melting zone with lowered melting-point temperature as characteristic of cast iron containing carbon in the range of about 2 to 4.25 per cent carbon;
   (d) adding a charge of solid steel scrap, into said liquid heat-transfer medium proximate said charge end opening, thereby continually cooling and maintaining said heat-transfer medium at a lowered temperature approaching said bath melting-point temperature;
   (e) continually advancing said solid steel scrap forward along said melting zone at a substantially faster average rate than said liquid heat-transfer medium is advancing, but not so rapidly that there is insufficient scrap present at each furnace cross-section to absorb substantially an equivalent quantity of heat to that transferred from said furnace gases and walls into said heat-transfer medium, that is, as necessary to cool and maintain said lowered temperature of said medium at each cross-section of said melting zone;
   (f) allowing said solid steel scrap to melt upon approaching completion of melting at termination of the melting zone, the scrap melted at this stage thereby diluting and lowering the bath carbon content with corresponding increase in bath melting-point temperature; and
   (g) discharging molten liquid ferrous metal from proximate said discharge end opening.

2. A process for steelmaking in an elongated rotary furnace incorporating refractory inner furnace walls extending along the length of the furnace from a restricted annular charge end opening extending through a melting zone terminating proximate ann intermediate annular dam restriction of the furnace interior cross-section, following on into a temperature-composition adjustment zone terminating proximate a restricted annular discharge end opening, comprising the combination of the following steps:
   (a) maintaining a hot liquid ferrous metal bath with a bath top surface spanning and confined between said charge end and discharge end openings and at least partially covered by a layer of slag, with undersurface contained and supported within said inner furnace wall, and the bath within said melting zone including immersed solid charge not yet melted;
   (b) supplying heat to said bath by combustion of fuel and oxygen to effect heat radiation directly onto said bath and slag surface from above and also indirectly by heating said inner furnace walls and thereby said bath by direct transfer from said wall surface to said under-surface of the bath during each oration, during the interval that the hated walls are passed beneath and in direct contact with said bath;
   (c) introducing supplementary carbon proximate the charge end opening to dissolve in the melting zone bath in sufficient quantity to form a liquid heat transfer medium within said melting zone with lowered melting-point temperature as characteristic of cast iron containing carbon in the range of about 2 to 4.25 per cent carbon;
   (d) adding a charge of solid steel scrap, into said liquid heat-transfer medium proximate said charge end opening, thereby continually cooling and maintaining said heat-transfer medium at a lowered temperature approaching said melting-point temperature;
   (e) continually advancing said solid steel scrap forward along said melting zone at a substantially faster average rate than said liquid heat-transfer medium is advancing, but not so rapidly that there is insufficient scrap present at each furnace cross-section to absorb substantially an equivalent quantity of heat to that transferred from said furnace gases and walls into said heat-transfer medium, that is, as necessary to cool and maintain said lowered temperature at each cross-section of said melting zone;
   (f) allowing said solid ferrous scrap to melt upon approaching completion of melting at termination of said melting zone, the scrap melted at this stage thereby diluting and lowering the bath carbon content with corresponding increase in overall bath melting-point temperature;

(g) restricting the liquid metal flow cross-section effecting an axial flow velocity across said annular dam, from said melting zone into said temperature-composition adjustment zone, substantially higher than the general rate of forward charge movement, at the same time substantially obstructing solid scrap from further advancement by means of the upstream face of said annular dam, thus providing a substantially solid-free temperature-composition adjustment zone extending to said discharge end opening, allowing liquid metal flow essentially only one-way over said annular dam from melting zone into temperature-composition adjustment zone forward in the axial direction, without back-mixing in the reverse direction across said annular dam restriction; and (h) advancing the liquid metal and slag within said temperature-composition adjustment zone and discharging said liquid metal proximate said discharge end opening.

3. A process for steelmaking in an elongated rotary furnace incorporating refractory inner furnace walls extending along the length of the furnace from a restricted annular charge end opening extending through a melting zone terminating proximate an intermediate annular dam restriction of the furnace interior cross-section, following on into a temperature-composition adjustment zone terminating proximate a restricted annular discharge end opening, with exhausting means for exhausting hot furnace gases out from said charge end opening and effecting general flow of combustion products within the furnace counter current to the general charge movement, comprising the combination of the following steps:

(a) maintaining a hot liquid ferrous metal bath with a bath to surface spanning and confined between said charge end and discharge end openings and at least partially covered by a layer of slag, with undersurface contained and supported within said inner furnace walls, and the bath within said melting zone including immersed solid charge not yet melted;

(b) heating said melting zone directly by means of at least one oxy-fuel burner projecting fuel and oxygen directly into said zone for combustion to effect heat radiation directly onto said melting zone bath and slag surface from above and also indirectly by heating said inner furnace walls and thereby said bath by direct transfer from said wall surface to said under-surface of the bath during each rotation, during the interval that the heated walls are passed beneath and in direct contact with said bath;

(c) introducing supplementary carbon proximate the change end opening to dissolve in the melting zone bath in sufficient quantity to form a liquid heat-transfer medium within said melting zone with lowered melting-point temperature as characteristic of cast iron containing carbon in the range of about 2 to 4.25 per cent carbon;

(d) adding a charge of solid steel scrap, into said liquid heat-transfer medium proximate said charge end opening, thereby continually cooling and maintaining said heat-transfer media at a lowered temperature approaching said melting-point temperature;

(e) continually advancing said solid steel scrap forward along said melting zone at a substantially faster average rate than said liquid heat-transfer medium is advancing, but not so rapidly that there is insufficient scrap present at each furnace cross-section to absorb substantially an equivalent quantity of heat to that transferred from said furnace gases and walls into said heat-transfer medium, that is, as necessary to cool and maintain said lowered temperature of said medium at each cross-section of said melting zone;

(f) allowing said solid ferrous scrap to melt upon approaching completion of melting at termination of said melting zone, the scrap melted at this stage thereby diluting and lowering the bath carbon content with corresponding increase in overall bath melting-point temperature;

(g) restricting the liquid metal flow cross-section effecting an axial flow velocity across said annular dam, from said melting zone into said temperature-composition adjustment zone, substantially higher than the rate of forward charge movement, at the same time substantially obstructing solid scrap from further advancement by means of the upstream face of said annular dam, thus providing a substantially solid-free temperature-composition adjustment zone extending to said discharge end opening, allowing liquid metal flow essentially only one-way over said annular dam from melting zone into temperature-composition adjustment zone forward in the axial direction, without back-mixing in the reverse direction across said annular dam restriction; and (h) heating said temperature-composition adjustment zone directly by means of at least one oxy-fuel burner projecting fuel and oxygen directly into said zone for combustion, thereby independently adjusting and controlling the temperature of liquid metal therein and also subsequently providing supplementary heat to said melting zone by said counter current flow of combustion products through said melting zone;

(i) advancing the liquid metal within said temperature-composition adjustment zone and discharging said liquid metal proximate said discharge end opening.

4. A process according to claim 1, claim 2 or claim 3 wherein said steel scrap substantially contains less than one per cent carbon, and the majority less than 0.5 per cent carbon.

5. A process according to claim 1, claim 2 or claim 3 wherein said liquid metal discharging proximate said discharge end opening comprises liquid steel.

6. A process according to claim 1, claim 2 or claim 3 wherein the longitudinal axis of said rotary furnace is inclined downwardly from the charge end towards the discharge end at an angle less than 1 degree, and said furnace is rotated to effect said substantially faster average rate of advance of said solid steel scrap in relation to said liquid heat-transfer medium.

7. A process according to claim 1, claim 2 or claim 3 wherein the net average rate of advance of said liquid heat-transfer medium maintained proximate said charge end opening is substantially zero, corresponding to effectively zero initial melting and dissolution of said solid steel scrap following introduction and prior to the scrap approaching its melting temperatures, that is, substantially all of the net advance of the charge is initially attributable to the advance of solid scrap which absorbs heat as a solid without melting, and wherein the majority of the liquid passing on from said melting zone comprises scrap having just melted within the final one-third of the length of the melting zone according to the stage when melting-point temperatures of said solid scrap have been reached.

8. A process according to claim 1, claim 2, or claim 3 wherein the melting zone bath is confined within carbon-magnesia refractory walls whereby the said substantial carbon content of said heat-transfer medium also substantially decreases refractory loss caused by refractory-carbon oxidation.

9. A process according to claim 1, claim 2, or claim 3 wherein the melting zone bath is confined within carbon-magnesia refractory walls whereby the said substantial carbon content of said heat-transfer medium also substantially decreases refractory loss caused by refractory-carbon oxidation, nd also including the step of introducing magnesia into the furnace charge sufficient to maintain the slag layer substantially magnesia-saturated, thereby decreasing refractory losses caused by magnesia-erosion from the furnace walls.

* * * * *